(12) United States Patent
Udatsu et al.

(10) Patent No.: US 9,901,870 B2
(45) Date of Patent: Feb. 27, 2018

(54) CARBON DIOXIDE CAPTURING SYSTEM AND METHOD OF OPERATING SAME

(71) Applicant: KABUSHIKI KAISHA TOSHIBA, Minato-ku (JP)

(72) Inventors: Mitsuru Udatsu, Kawasaki (JP); Masatoshi Hodotsuka, Saitama (JP); Hideo Kitamura, Tokyo (JP); Satoshi Saito, Yamato (JP); Haruki Fujimoto, Yokohama (JP); Noriko Chiba, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/221,407

(22) Filed: Mar. 21, 2014

(65) Prior Publication Data

US 2014/0301927 A1 Oct. 9, 2014

(30) Foreign Application Priority Data

Apr. 9, 2013 (JP) ................................. 2013-081405
Nov. 29, 2013 (JP) ................................. 2013-247607

(51) Int. Cl.
  *B01D 53/14* (2006.01)
  *B01D 53/62* (2006.01)

(52) U.S. Cl.
  CPC ......... *B01D 53/62* (2013.01); *B01D 53/1412* (2013.01); *B01D 53/1425* (2013.01);
  (Continued)

(58) Field of Classification Search
  CPC ........... B01D 53/1425; B01D 53/1475; Y02C 10/04; Y02C 10/06
  See application file for complete search history.

(56) References Cited

U.S. PATENT DOCUMENTS 3,266,219 A 8/1966 Woertz
3,958,943 A 5/1976 Carmassi et al.
(Continued)

FOREIGN PATENT DOCUMENTS

EP 2 418 470 A1 2/2012
EP 2 612 699 A1 7/2013
(Continued)

OTHER PUBLICATIONS

Office Action dated Mar. 24, 2015 in Australian Patent Application No. 2014201809.
(Continued)

*Primary Examiner* — Cabrena Holecek
(74) *Attorney, Agent, or Firm* — Oblon, McClelland, Maier & Neustadt, L.L.P.

(57) ABSTRACT

In one embodiment, a carbon dioxide capturing system includes an absorption tower configured to bring a treatment target gas containing carbon dioxide into contact with an absorption liquid, and to discharge the absorption liquid having absorbed the carbon dioxide. The system further includes a regeneration tower configured to make the absorption liquid discharged from the absorption tower dissipate the carbon dioxide, and to discharge the absorption liquid having dissipated the carbon dioxide. The system further includes a treatment target gas line configured to introduce the treatment target gas into the absorption tower, a first introduction module configured to introduce a first gas having a higher carbon dioxide concentration than the treatment target gas into the treatment target gas line, and a second introduction module configured to introduce a second gas having a lower carbon dioxide concentration than the treatment target gas into the treatment target gas line.

14 Claims, 5 Drawing Sheets

(52) U.S. Cl.
CPC ...... *B01D 53/1475* (2013.01); *B01D 2251/30* (2013.01); *B01D 2252/20484* (2013.01); *B01D 2252/20489* (2013.01); *B01D 2252/30* (2013.01); *B01D 2258/0283* (2013.01); *Y02C 10/04* (2013.01); *Y02C 10/06* (2013.01); *Y02C 10/08* (2013.01)

(56) References Cited

U.S. PATENT DOCUMENTS

| | | | |
|---|---|---|---|
| 3,967,937 A * | 7/1976 | Hobbs | B01D 53/14 700/37 |
| 4,106,916 A | 8/1978 | Tuckett et al. | |
| 8,007,567 B2 * | 8/2011 | Roe | B01D 53/1406 95/12 |
| 2006/0110300 A1 | 5/2006 | Mak | |
| 2010/0005722 A1 | 1/2010 | Iijima et al. | |
| 2010/0229720 A1 * | 9/2010 | Sonwane | B01D 53/1425 95/46 |
| 2011/0120128 A1 * | 5/2011 | Handagama | F23J 15/006 60/649 |
| 2012/0067219 A1 | 3/2012 | Ogawa et al. | |
| 2012/0148466 A1 | 6/2012 | Mejdell et al. | |
| 2012/0247103 A1 | 10/2012 | Handagama et al. | |
| 2012/0247104 A1 | 10/2012 | Handagama et al. | |
| 2013/0152782 A1 * | 6/2013 | Yokoyama | B01D 53/1412 95/8 |
| 2014/0086798 A1 | 3/2014 | Iijima et al. | |
| 2014/0086799 A1 | 3/2014 | Iijima et al. | |

FOREIGN PATENT DOCUMENTS

| | | |
|---|---|---|
| JP | 53-52284 A | 5/1978 |
| JP | 2005-538841 A | 12/2005 |
| JP | 2010-100491 A | 5/2010 |
| JP | 2011-20090 A | 2/2011 |
| JP | 2011-42554 A | 3/2011 |
| JP | 2012-45518 A | 3/2012 |
| JP | 2013-511387 A | 4/2013 |
| WO | WO 2004/026441 A1 | 4/2004 |
| WO | WO 2012/029704 A1 | 3/2012 |
| WO | WO 2012029704 A1 * | 3/2012 ......... B01D 53/1412 |

OTHER PUBLICATIONS

Extended European Search Report dated Nov. 6, 2014 in European Patent Application No. 14162094.8.
The Partial European Search Report dated Aug. 12, 2014, in Application No. / Patent No. 14162094.8-1356.
Combined Chinese Office Action and Search Report dated Aug. 5, 2015 in Patent Application No. 201410133615.1 (with English language translation).
Extended Search Report dated Oct. 1, 2015 in European Patent Application No. 15170766.8.
Office Action dated Apr. 19, 2016 in Chinese Patent Application No. 201410133615.1 (with English language translation).
Combined Chinese Office Action and Search Report dated Oct. 8, 2016 in Patent Application No. 201410133615.1 (with English language translation).
Office Action dated Aug. 25, 2016 in Australian Patent Application No. 2015249027.

\* cited by examiner

CARBON DIOXIDE CAPTURING SYSTEM AND METHOD OF OPERATING SAME

CROSS REFERENCE TO RELATED APPLICATIONS

This application is based upon and claims the benefit of priority from the prior Japanese Patent Applications No. 2013-81405, filed on Apr. 9, 2013 and No. 2013-247607, filed on Nov. 29, 2013, the entire contents of which are incorporated herein by reference.

FIELD

Embodiments described herein relate to a carbon dioxide capturing system and a method of operating the same.

BACKGROUND

In recent years, carbon dioxide capture and storage (CCS) technology has received attention as an effective measure for the global warming problem. For example, a carbon dioxide capturing system is investigated that captures carbon dioxide in a process exhaust gas (treatment target gas) generated from a combustion boiler and the like of a thermal power station or ironworks by using an absorption liquid.

In such a carbon dioxide capturing system, when a variation in load of the boiler or a change in supply amount of air or fuel has been generated according to a change in operation of the thermal power station or the ironworks, a carbon dioxide concentration and a gas flow rate of the supplied process exhaust gas rapidly change. However, a conventional carbon dioxide capturing system cannot deal with these rapid changes by changing process conditions of the carbon dioxide capturing system. Accordingly, the carbon dioxide capturing system becomes unstable and generates abnormal heat.

In addition, such a carbon dioxide capturing system is desirably started promptly up to a rated operation point. However, when operating conditions of the carbon dioxide capturing system are set to become highly efficient, the circulating flow rate of the absorption liquid is small and a heat quantity to be charged into a reboiler per unit time is small. Accordingly, it takes long time for the carbon dioxide capturing system to be started up.

Furthermore, the carbon dioxide capturing system for the plant which discharges a large amount of process exhaust gas holds a large amount of the absorption liquid. Accordingly, it takes long time for the absorption liquid to be circulated in the carbon dioxide capturing system. Therefore, when the operation of the carbon dioxide capturing system is in an unstable state, it takes long time to shift the unstable state to a steady state. Furthermore, when the operating conditions of the carbon dioxide capturing system are changed along with the variation in load of the combustion boiler and the like, it also takes long time to shift the operation of the carbon dioxide capturing system from the unstable state to the steady state.

DETAILED DESCRIPTION

Embodiments will now be explained with reference to the accompanying drawings.

In one embodiment, a carbon dioxide capturing system includes an absorption tower configured to bring a treatment target gas containing carbon dioxide into contact with an absorption liquid for absorbing the carbon dioxide, and to discharge the absorption liquid having absorbed the carbon dioxide and an absorption tower exhaust gas containing the treatment target gas from which the carbon dioxide has been removed. The system further includes a regeneration tower configured to make the absorption liquid discharged from the absorption tower dissipate the carbon dioxide, and to discharge the absorption liquid having dissipated the carbon dioxide and a regeneration tower exhaust gas containing the carbon dioxide. The system further includes a treatment target gas line configured to introduce the treatment target gas into the absorption tower. The system further includes a first introduction module configured to introduce a first gas having a higher carbon dioxide concentration than the treatment target gas into the treatment target gas line. The system further includes a second introduction module configured to introduce a second gas having a lower carbon dioxide concentration than the treatment target gas into the treatment target gas line.

First Embodiment

Figure 1:
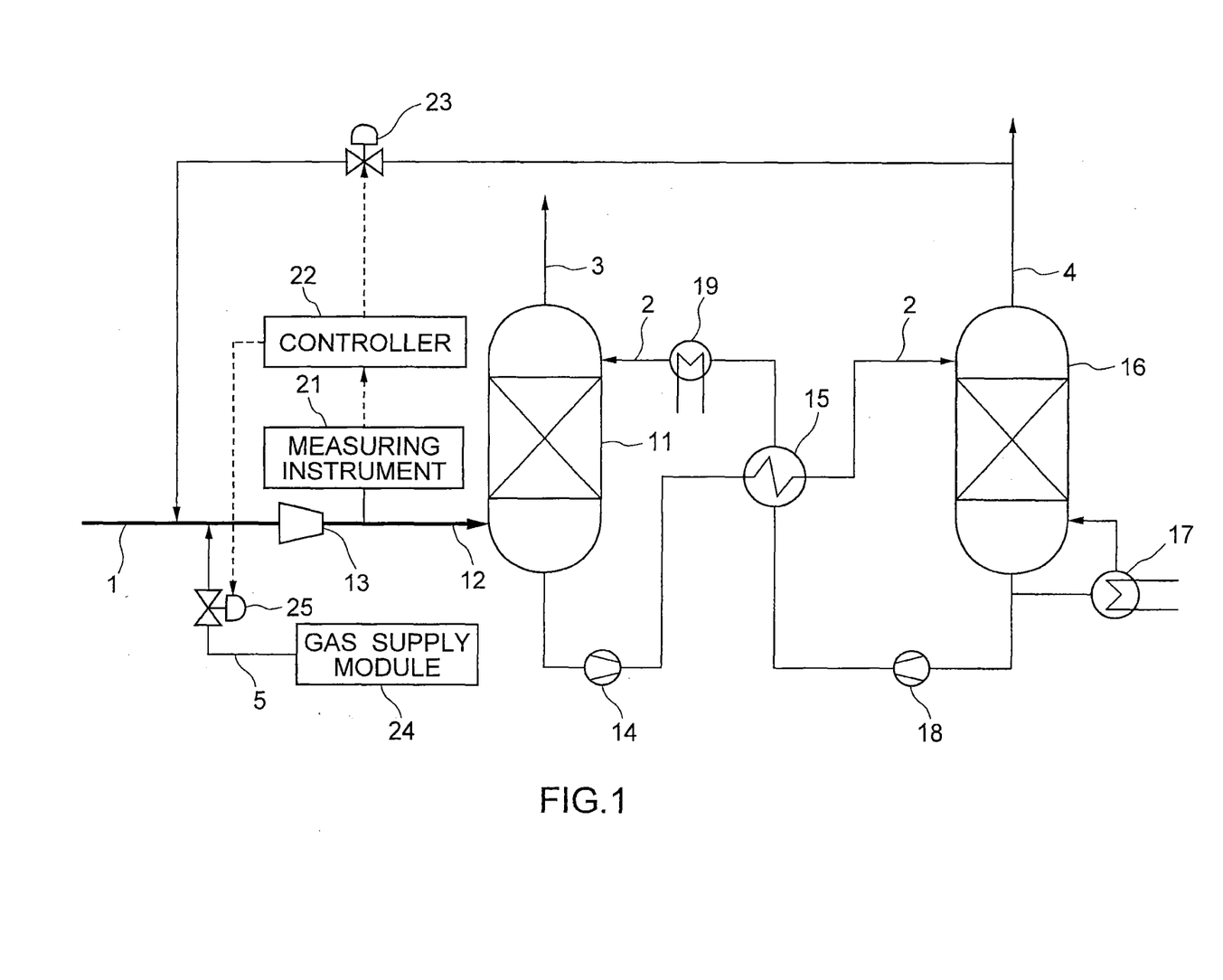
FIG. 1 is a schematic view illustrating a structure of a carbon dioxide capturing system of a first embodiment.

FIG. 1 is a schematic view illustrating a structure of a carbon dioxide capturing system of a first embodiment.

The carbon dioxide capturing system of FIG. 1 includes an absorption tower 11, a process exhaust gas line 12 as an example of a treatment target gas line, a blower 13, a rich liquid pump 14, a regenerative heat exchanger 15, a regeneration tower 16, a reboiler 17, a lean liquid pump 18 and a cooler 19.

The absorption tower 11 is structured, for example, of a countercurrent type gas-liquid contact apparatus. The absorption tower 11 introduces a process exhaust gas 1 containing carbon dioxide from its lower part, and introduces an absorption liquid (lean liquid) 2 for absorbing the carbon dioxide from its upper part.

The absorption tower 11 then brings the process exhaust gas 1 in gas-liquid contact with the absorption liquid 2, discharges the absorption liquid (rich liquid) 2 having absorbed the carbon dioxide from its lower part, and discharges an absorption tower exhaust gas 3 containing the process exhaust gas 1 from which the carbon dioxide has been removed from its upper part.

The absorption tower 11 of the present embodiment has a structure in which one or more layers of fillers or trays are arranged, in order to efficiently proceed the gas-liquid contact.

The process exhaust gas 1 is introduced into the absorption tower 11 through the process exhaust gas line 12. At this time, the process exhaust gas 1 is pressurized to an arbitrary pressure by the blower 13 on the process exhaust gas line 12. The process exhaust gas 1 is an example of a treatment target gas of the disclosure. The process exhaust gas 1 is supplied from a thermal power station or ironworks, for example.

The absorption liquid 2 includes, for example, an aqueous amine-based solution such as monoethanolamine or diethanolamine, an aqueous alkaline solution, an ionic liquid or an aqueous solution of it, but the absorption liquid 2 is not limited to these liquids.

The absorption liquid 2 discharged from the absorption tower 11 is transferred to the regeneration tower 16 by the rich liquid pump 14 through the regenerative heat exchanger 15. At this time, the absorption liquid 2 which heads for the regeneration tower 16 from the absorption tower 11 is heated by heat exchange in the regenerative heat exchanger 15.

The regeneration tower 16 heats the introduced absorption liquid 2, thereby makes the absorption liquid 2 dissipate most of the carbon dioxide together with steam, and separates carbon dioxide from the absorption liquid 2. The regeneration tower 16 is structured, for example, of a countercurrent type gas-liquid contact apparatus. The regeneration tower 16 heats the absorption liquid 2 by exchanging heat between high temperature steam which is external supply heat generated in the reboiler 17 and the absorption liquid 2.

The regeneration tower 16 then discharges a regeneration tower exhaust gas 4 which contains the dissipated carbon dioxide and steam from its upper part, and discharges the absorption liquid (lean liquid) 2 which has dissipated carbon dioxide from its lower part.

The regeneration tower 16 of the present embodiment has a structure in which one or more layers of fillers or trays are arranged, in order to efficiently proceed gas-liquid contact.

The absorption liquid 2 discharged from the regeneration tower 16 is returned to the absorption tower 11 by the lean liquid pump 18 through the regenerative heat exchanger 15 and the cooler 19. At this time, the absorption liquid 2 which heads for the absorption tower 11 from the regeneration tower 16 is cooled by heat exchange in the regenerative heat exchanger 15 and by a cooling action in the cooler 19.

A subsequent treatment process of the regeneration tower exhaust gas 4 which has been discharged from the regeneration tower 16 differs according to the purpose of use, but generally, the moisture content in the exhaust gas is condensed by cooling and is removed. After that, the regeneration tower exhaust gas 4 from which the moisture content has been removed is transferred into a state such as a supercritical state and a liquid state according to the purpose of use, by a compression pump, and is stored and transported by a tank, a lorry, a pipeline and the like.

The carbon dioxide capturing system of FIG. 1 further includes a measuring instrument 21, a controller 22, a regeneration tower exhaust gas valve 23, a gas supply module 24 and a supply gas valve 25.

The measuring instrument 21 monitors a carbon dioxide concentration and/or a gas flow rate of the process exhaust gas 1 which flows through the process exhaust gas line 12. In FIG. 1, the measuring instrument 21 measures the carbon dioxide concentration and/or the gas flow rate of the process exhaust gas 1 which flows between the blower 13 and the absorption tower 11.

The controller 22 controls the opening of the regeneration tower exhaust gas valve 23, an action of the gas supply module 24, and the opening of the supply gas valve 25, based on the measured values (carbon dioxide concentration and/or gas flow rate) by the measuring instrument 21.

For example, the controller 22 opens the regeneration tower exhaust gas valve 23, thereby introduces the regeneration tower exhaust gas 4 from the regeneration tower 16 into the process exhaust gas line 12, and can mix the regeneration tower exhaust gas 4 into the process exhaust gas 1. At this time, the controller 22 adjusts the opening and the opening period of the regeneration tower exhaust gas valve 23, and thereby can control an amount of the regeneration tower exhaust gas 4 to be introduced. The regeneration tower exhaust gas valve 23 and the regeneration tower 16 are an example of a first introduction module of the disclosure. In addition, the regeneration tower exhaust gas 4 is an example of a first gas having a higher carbon dioxide concentration than the treatment target gas.

In addition, the controller 22 opens the supply gas valve 25, thereby introduces a supply gas 5 from the gas supply module 24 into the process exhaust gas line 12, and can mix the supply gas 5 into the process exhaust gas 1. At this time, the controller 22 adjusts the opening and the opening period of the supply gas valve 25, and thereby can control an amount of the supply gas 5 to be introduced. The supply gas valve 25 and the gas supply module 24 are an example of a second introduction module of the disclosure. In addition, the supply gas 5 is an example of a second gas having a lower carbon dioxide concentration than the treatment target gas.

The supply gas 5 is, for example, air, an inert gas, or a mixed gas obtained by mixing air with an inert gas. Examples of the inert gas include nitrogen gas, helium gas and argon gas.

(1) Controls of Carbon Dioxide Concentration and Gas Flow Rate of Process Exhaust Gas 1

Subsequently with reference to FIG. 1, the controls of the carbon dioxide concentration and the gas flow rate of the process exhaust gas 1 will be described below.

The carbon dioxide concentration and the gas flow rate of the process exhaust gas 1 are dependent on an operation state of a boiler of a discharge source, but show stable behavior if the boiler is operated in a steady state. However, if there are variations in a load in the boiler, changes in the amount of air to be supplied and the amount of fuel to be supplied, and a rapid change of a soot blow and the like, the carbon dioxide concentration and the gas flow rate of the process exhaust gas 1 rapidly increase or decrease.

A conventional carbon dioxide capturing system can deal with the increase of the gas flow rate by reducing the amount of the gas to be introduced to the system by a setup of a blower, an adjustment of a regulating valve and the like, but cannot deal with the increase or decrease of the carbon dioxide concentration or the decrease of the gas flow rate, by a carbon dioxide capturing system side.

In the conventional carbon dioxide capturing system, when a rapid increase and decrease of the carbon dioxide concentration and a rapid decrease of the gas flow rate have occurred, it takes long time before the plant is stabilized, even if the carbon dioxide capturing system promptly changes process conditions corresponding to the occurrences.

Because of this, abnormal behavior occurs such as hunting in which the dissipation of carbon dioxide and the stop of the dissipation are repeated in the regeneration tower, which originates in the abnormal heating of the absorption tower, rapid variations in a liquid level in the absorption tower or the regeneration tower, rapid variations in the pressure in the regeneration tower, and/or the like, and the carbon dioxide capturing system may fall into an uncontrollable state. In addition, a rapid change of the process condition can also be similarly a cause of inducing abnormal behavior such as hunting.

The carbon dioxide capturing system of the present embodiment then senses that the carbon dioxide concentration and the gas flow rate of the process exhaust gas 1 have varied to the outside of an allowable range which has been arbitrarily set, and introduces the regeneration tower exhaust gas 4 and the supply gas 5 into the process exhaust gas line 12. At this time, the carbon dioxide capturing system of the present embodiment adjusts the opening and the opening period of the regeneration tower exhaust gas valve 23 and the supply gas valve 25 so that the carbon dioxide concentration and the gas flow rate of the process exhaust gas 1 are returned to the allowable range and are kept in the range. Thereby, in the present embodiment, even when the carbon dioxide concentration and the gas flow rate of the process exhaust gas 1 have rapidly changed, the carbon dioxide capturing system can continue the stable operation.

Specifically, when the measuring instrument 21 senses that the carbon dioxide concentration of the process exhaust gas 1 is lower than a lower limit of the allowable range of the concentration, the controller 22 makes the regeneration tower exhaust gas valve 23 open. Thereby, the regeneration tower exhaust gas 4 is introduced into the process exhaust gas line 12 and is mixed with the process exhaust gas 1, and thereby the carbon dioxide concentration of the process exhaust gas 1 increases.

On the other hand, when the measuring instrument 21 senses that the carbon dioxide concentration of the process exhaust gas 1 is higher than an upper limit of the allowable range of the concentration, the controller 22 makes the supply gas valve 25 open. Thereby, the supply gas 5 is introduced into the process exhaust gas line 12 and is mixed with the process exhaust gas 1, and thereby the carbon dioxide concentration of the process exhaust gas 1 decreases.

In addition, when the measuring instrument 21 senses that the gas flow rate of the process exhaust gas 1 is lower than a lower limit of the allowable range of the flow rate, the controller 22 makes both the regeneration tower exhaust gas valve 23 and the supply gas valve 25 open. Thereby, the regeneration tower exhaust gas 4 and the supply gas 5 are introduced into the process exhaust gas line 12 and are mixed with the process exhaust gas 1, and thereby the gas flow rate of the process exhaust gas 1 increases.

At this time, a ratio between the introduction amounts of the regeneration tower exhaust gas 4 and the supply gas 5 is set so that the carbon dioxide concentration of the process exhaust gas 1 which has been mixed with these gases falls within the allowable range of the concentration. Thereby, in the present embodiment, the gas flow rate of the process exhaust gas 1 can be increased, while the carbon dioxide concentration of the process exhaust gas 1 is not largely varied. The ratio between the introduction amounts of the regeneration tower exhaust gas 4 and the supply gas 5 can be set by using a function which has been previously prepared, for example.

After that, in the stage in which the variations in the carbon dioxide concentration and the gas flow rate of the process exhaust gas 1 have been settled and become a stabilized state, the controller 22 mildly changes various conditions of the carbon dioxide capturing system to a condition which suits the state of the time. Thereby, in the present embodiment, the stable operation of the system can be continued while the occurrence of abnormal behavior such as the heat generation and hunting of the carbon dioxide capturing system is suppressed.

(2) Details of Regeneration Tower Exhaust Gas 4 and Supply Gas 5

Subsequently with reference to FIG. 1, the regeneration tower exhaust gas 4 and the supply gas 5 will be described in detail below.

The regeneration tower exhaust gas 4 to be introduced into the process exhaust gas line 12 in the present embodiment can be a gas in any stage. The regeneration tower exhaust gas 4, for example, may be a gas before impurities such as a moisture content are removed or after the impurities have been removed, may be a gas which has been returned to gas from a supercritical state or a liquid state, or may be a gas before being stored by a tank, a lorry, an adsorbent and the like, or may be a gas which has been stored thereby.

In addition, in the present embodiment, the regeneration tower exhaust gas 4 is used as a gas for increasing the carbon dioxide concentration of the process exhaust gas 1, but other gases having a higher carbon dioxide concentration than the process exhaust gas 1 may be used. In this case, this gas may be supplied from a gas bomb, a tank, a gas line from the outside of the carbon dioxide capturing system, and the like.

Similarly, the supply gas 5 of the present embodiment can be introduced into the process exhaust gas line 12 by any method. The supply gas 5 can be introduced, for example, from a gas bomb, a tank, a gas line from the outside of the carbon dioxide capturing system, and the like.

An example of the supply gas 5 includes a gas which contains an arbitrary concentration of an inert gas. In this case, as long as a gas composition and inert gas concentration in the supply gas 5 are a composition and concentration which can adjust the carbon dioxide concentration of the process exhaust gas 1 within the allowable range when the supply gas 5 is mixed with the process exhaust gas 1, any composition and concentration can be used. Another example of the supply gas 5 includes air.

When the inert gas is used as the supply gas 5, there is an advantage that the corrosion of a gas duct and the like can be suppressed. In addition, when air is used as the supply gas 5, there is an advantage that the supply gas 5 can be inexpensively prepared. The supply gas 5 of the present embodiment can contain carbon dioxide as long as the carbon dioxide concentration is lower than that of the process exhaust gas 1.

As has been described above, the carbon dioxide capturing system of the present embodiment includes a first introduction module which introduces a first gas (regeneration tower exhaust gas 4, for example) having a higher carbon dioxide concentration than the gas 1 to be treated into the line 12 of the treatment target gas, and a second introduction module which introduces a second gas (supply gas 5, for example) having a lower carbon dioxide concentration than the gas 1 to be treated into the line 12 of the treatment target gas.

Therefore, according to the present embodiment, it becomes possible to continue the stable operation of the carbon dioxide capturing system even when the carbon dioxide concentration and the gas flow rate of the gas 1 to be treated have rapidly changed.

Second Embodiment

Figure 2:
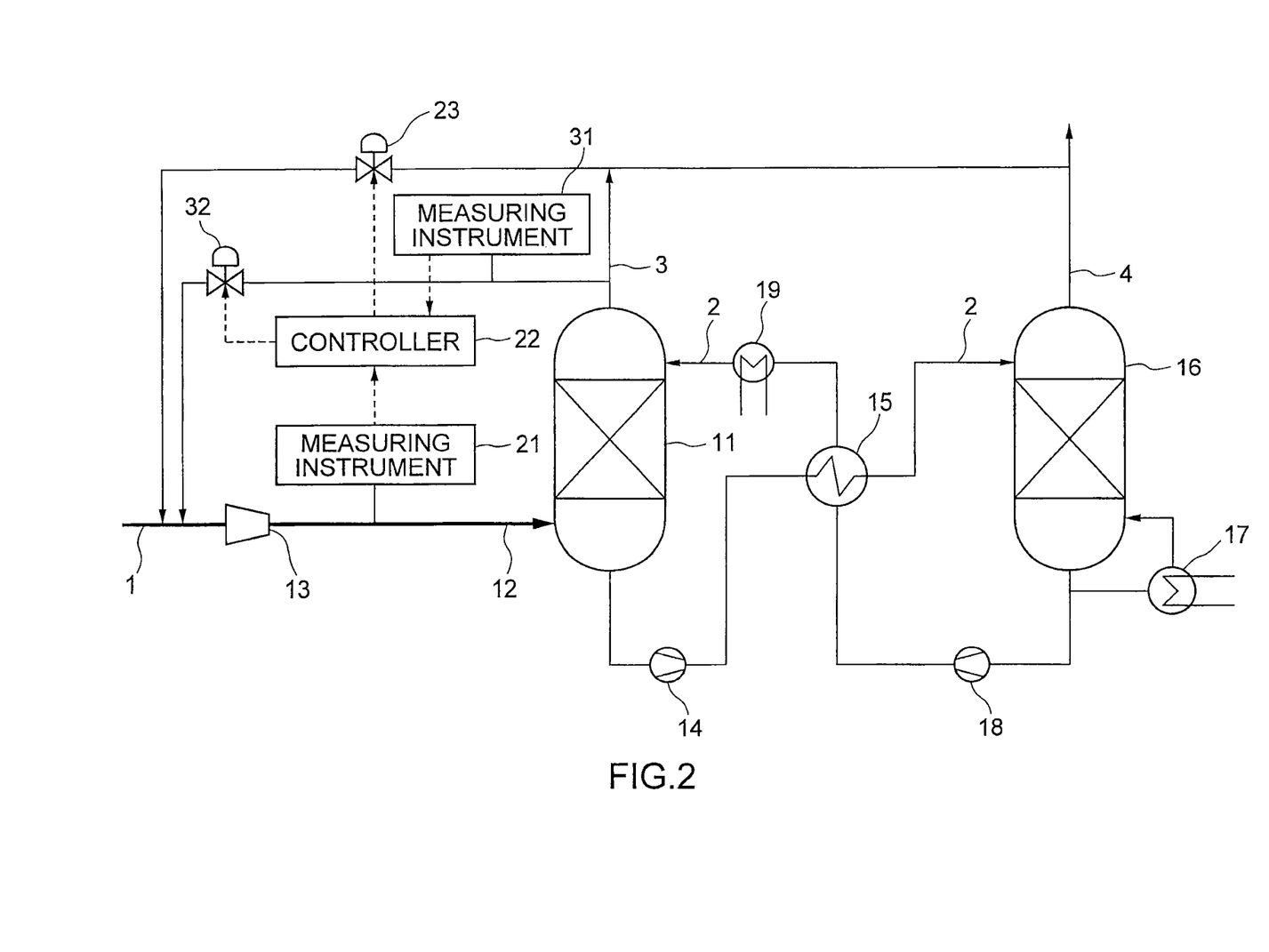
FIG. 2 is a schematic view illustrating a structure of a carbon dioxide capturing system of a second embodiment.

FIG. 2 is a schematic view illustrating a structure of a carbon dioxide capturing system of a second embodiment.

The carbon dioxide capturing system of FIG. 2 includes a measuring instrument 31 which measures a carbon dioxide concentration of the absorption tower exhaust gas 3, and a valve 32 for an absorption tower exhaust gas, which introduces the absorption tower exhaust gas 3 therethrough into the process exhaust gas line 12, in place of the gas supply module 24 and the supply gas valve 25 illustrated in FIG. 1.

The valve 32 for the absorption tower exhaust gas and the absorption tower 11 are an example of a second introduction module of the disclosure. In addition, the absorption tower exhaust gas 3 is an example of a second gas in which a carbon dioxide concentration is lower than that of the treatment target gas.

In the following description, in order to distinguish the measuring instrument 21 and the measuring instrument 31 from each other, the measuring instrument 21 is referred to as a first measuring instrument, and the measuring instrument 31 is referred to as a second measuring instrument.

The carbon dioxide capturing system of the present embodiment senses that the carbon dioxide concentration and the gas flow rate of process exhaust gas 1 have varied to the outside of an allowable range which has been arbitrarily set, and then introduces the regeneration tower exhaust gas 4 and the absorption tower exhaust gas 3 into the process exhaust gas line 12. At this time, the carbon dioxide capturing system of the present embodiment adjusts the opening and the opening period of the regeneration tower exhaust gas valve 23 and the valve 32 for the absorption tower exhaust gas so that the carbon dioxide concentration and the gas flow rate of the process exhaust gas 1 are returned to the allowable range and are kept in the range.

Specifically, when the first measuring instrument 21 senses that the carbon dioxide concentration of the process exhaust gas 1 is lower than a lower limit of the allowable range of the concentration, a controller 22 makes the regeneration tower exhaust gas valve 23 open. Thereby, the regeneration tower exhaust gas 4 is introduced into the process exhaust gas line 12 and is mixed with the process exhaust gas 1, and thereby the carbon dioxide concentration of the process exhaust gas 1 increases.

On the other hand, when the first measuring instrument 21 senses that the carbon dioxide concentration of the process exhaust gas 1 is higher than an upper limit of the allowable range of the concentration, the controller 22 makes the valve 32 for the absorption tower exhaust gas open. Thereby, the absorption tower exhaust gas 3 is introduced into the process exhaust gas line 12 and is mixed with the process exhaust gas 1, and thereby the carbon dioxide concentration of the process exhaust gas 1 decreases.

At this time, it becomes a problem that the carbon dioxide concentration of the absorption tower exhaust gas 3 varies depending on an absorption efficiency of carbon dioxide in the absorption tower 11. Then, in the present embodiment, in order to determine the amount of the absorption tower exhaust gas 3 to be introduced, the second measuring instrument 31 measures the carbon dioxide concentration of the absorption tower exhaust gas 3.

In the present embodiment, the measured value of the concentration is fed back to the controller 22, and thereby the amount of the absorption tower exhaust gas 3 to be introduced is determined. Specifically, when the measured value of the concentration is high, the introduction amount is decreased, and when the measured value of the concentration is low, the introduction amount is increased.

In addition, when the first measuring instrument 21 senses that the gas flow rate of the process exhaust gas 1 is lower than a lower limit of the allowable range of the flow rate, the controller 22 makes both the regeneration tower exhaust gas valve 23 and the valve 32 for the absorption tower exhaust gas open. Thereby, the regeneration tower exhaust gas 4 and the absorption tower exhaust gas 3 are introduced into the process exhaust gas line 12 and are mixed with the process exhaust gas 1, and thereby the gas flow rate of the process exhaust gas 1 increases.

At this time, a ratio between the introduction amounts of the regeneration tower exhaust gas 4 and the absorption tower exhaust gas 3 is determined so that the carbon dioxide concentration of the process exhaust gas 1 which has been mixed with these gases falls within the allowable range of the concentration. This method is similar to that in the first embodiment. However, in the present embodiment, also when the ratio between these introduction amounts is determined, the carbon dioxide concentration of the absorption tower exhaust gas 3, which has been measured by the second measuring instrument 31, is used together with the measured value by the first measuring instrument 21.

After that, in the stage in which the variations in the carbon dioxide concentration and the gas flow rate of the process exhaust gas 1 have been settled and become a stabilized state, the controller 22 mildly changes various conditions of the carbon dioxide capturing system to a condition which suits the state of the time. Thereby, in the present embodiment in a similar way to that in the first embodiment, the stable operation of the system can be continued while the occurrence of abnormal behavior such as the heat generation of the carbon dioxide capturing system and hunting is suppressed.

As has been described above, the carbon dioxide capturing system of the present embodiment includes a first introduction module which introduces the regeneration tower exhaust gas 4 into the line 12 of the treatment target gas, and a second introduction module which introduces the absorption tower exhaust gas 3 into the line 12 of the treatment target gas.

Therefore, according to the present embodiment in a similar way to that in the first embodiment, it becomes possible to continue the stable operation of the carbon dioxide capturing system even when the carbon dioxide concentration and the gas flow rate of the gas 1 to be treated have rapidly changed.

When the absorption tower exhaust gas 3 and the regeneration tower exhaust gas 4 are used as the gas to be introduced into the line 12 of the treatment target gas, there is an advantage that the introduced gases can be inexpensively prepared, similarly to the case where air is used as the supply gas 5.

Modifications of First and Second Embodiments

Modifications of the first and second embodiments will be described below.

The first measuring instrument 21 of the first and second embodiments measures the carbon dioxide concentration and the gas flow rate of the process exhaust gas 1, at a point in between the blower 13 and the absorption tower 11. However, if the controller 22 can control the carbon dioxide concentration and the gas flow rate of the process exhaust gas 1 before the gas is introduced into the absorption tower 11, the first measuring instrument 21 may measure the carbon dioxide concentration and the gas flow rate of the process exhaust gas 1 at another point. Similarly, the second measuring instrument 31 may measure the carbon dioxide concentration of the absorption tower exhaust gas 3 at another point than the point illustrated in FIG. 2.

In addition, as for points at which the regeneration tower exhaust gas 4 and the supply gas 5 are introduced into the process exhaust gas line 12, any point may be provided in an upstream side. Similarly, as for points at which the regeneration tower exhaust gas 4 and the absorption tower exhaust gas 3 are introduced into the process exhaust gas line 12, any point may be provided in an upstream side. However, these introduction points of the gases are desirably provided in a more upstream side than the measurement point of the first measuring instrument 21 in the process exhaust gas line 12. The reason is because when these introduction points of the gases are provided in the more upstream side than the measurement point, the carbon dioxide concentration and/or the gas flow rate of these gases are reflected in the measured values by the first measuring instrument 21, and the measured values can be used in feedback control.

In addition, in the first and second embodiments, the carbon dioxide concentration and the gas flow rate of the process exhaust gas 1 are automatically controlled by feedback control such as PID control due to the controller 22, but may be manually controlled in place of the feedback control. In the first and second embodiments, for example, the openings and the opening periods of time of valves 23, 25 and 32 are automatically adjusted by the controller 22, but these valves 23, 25 and 32 are formed so as to be a manual valve, and a worksite operator may manually adjust the valves.

In addition, in the first and second embodiments, a measuring instrument for grasping the gas composition of the process exhaust gas 1 may be installed, and the measurement result may be used for the feedback control by the controller 22.

In addition, in the first and second embodiments, both the carbon dioxide concentration and the gas flow rate of the process exhaust gas 1 are determined to be objects to be controlled, but any one of the objects may be determined to be the objects to be controlled. In this case, the first measuring instrument 21 may be determined to measure any one of the objects.

In addition, a carbon dioxide capturing system which has both structures of the first and second embodiments may be adopted, in place of the first and second embodiments. This carbon dioxide capturing system can introduce the absorption tower exhaust gas 3, the regeneration tower exhaust gas 4 and the supply gas 5, into the process exhaust gas line 12.

Third Embodiment

Figure 3:
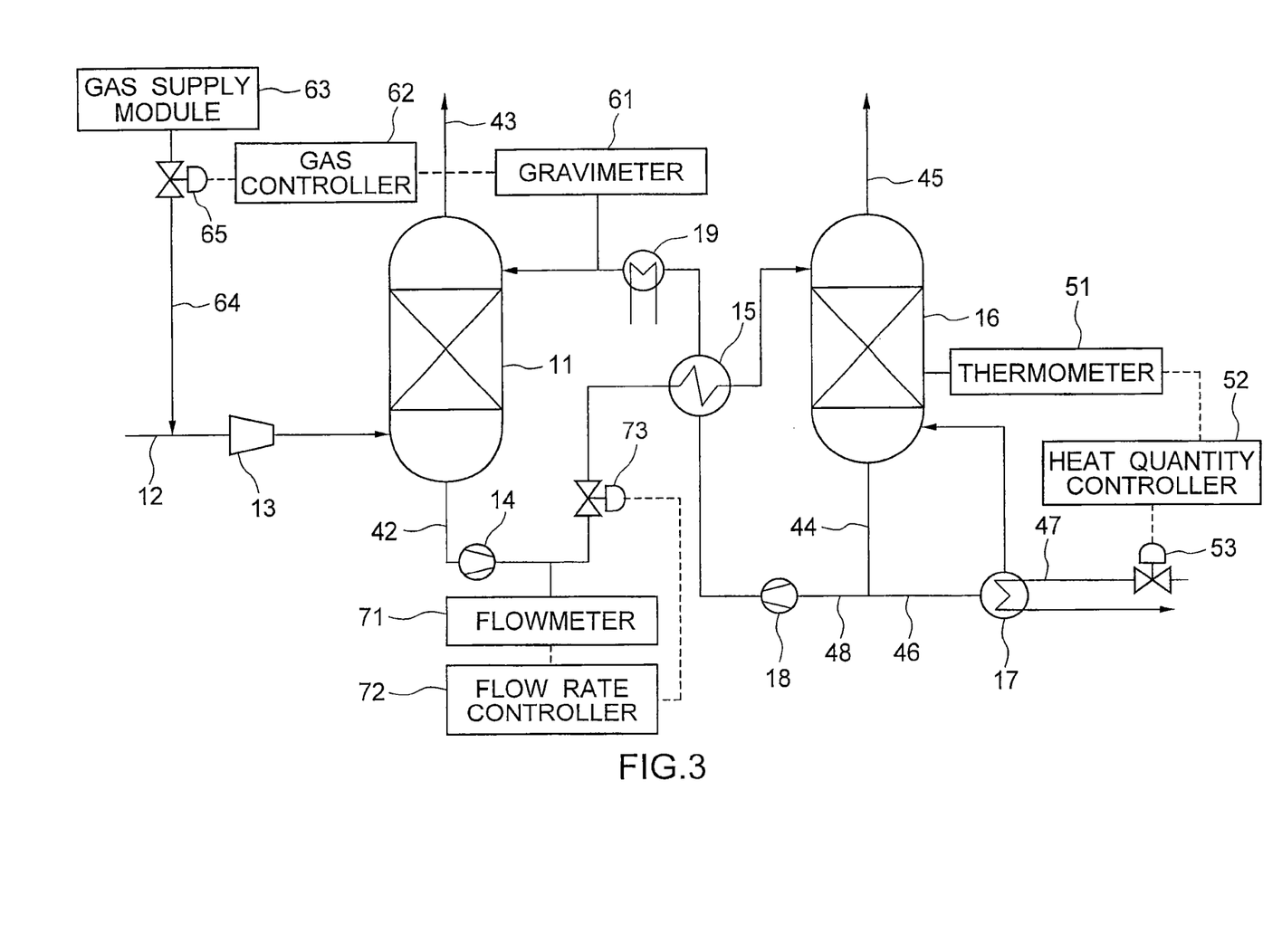
FIG. 3 is a schematic view illustrating a structure of a carbon dioxide capturing system of a third embodiment.

FIG. 3 is a schematic view illustrating a structure of a carbon dioxide capturing system of a third embodiment.

The carbon dioxide capturing system of FIG. 3 includes an absorption tower 11, a blower 13, a rich liquid pump 14, a regenerative heat exchanger 15, a regeneration tower 16, a reboiler 17, a lean liquid pump 18 and a cooler 19.

The carbon dioxide capturing system of FIG. 3 further includes a process exhaust gas line 12, a first absorption liquid line 42, an absorption tower exhaust gas line 43, a second absorption liquid line 44, a regeneration tower exhaust gas lines 45, a third absorption liquid line 46, a steam line 47 and a fourth absorption liquid line 48. The process exhaust gas line 12 is an example of a line of a treatment target gas. The first to fourth absorption liquid lines 42, 44, 46 and 48 are examples of the absorption liquid line.

The absorption tower 11 is structured, for example, of a countercurrent type gas-liquid contact apparatus. The absorption tower 11 introduces the process exhaust gas containing carbon dioxide from its lower part, and introduces an absorption liquid (lean liquid) for absorbing the carbon dioxide from its upper part. The process exhaust gas is an example of the treatment target gas. The process exhaust gas is introduced into the absorption tower 11 from the process exhaust gas line 12. The absorption liquid is introduced into the absorption tower 11 from the fourth absorption liquid line 48.

The process exhaust gas is pressurized to an arbitrary pressure by the blower 13 on the process exhaust gas line 12, when being introduced into the absorption tower 11 from the process exhaust gas line 12. The process exhaust gas is introduced, for example, from a combustion boiler of a thermal power station or ironworks, and the like.

The absorption liquid is, for example, an aqueous amine-based solution such as monoethanolamine and diethanolamine, an aqueous alkaline solution, an ionic liquid and an aqueous solution of it, and the like, but is not limited to these liquids.

The absorption tower 11 brings the absorption liquid into gas-liquid contact with the process exhaust gas. Then, the absorption tower 11 discharges the absorption liquid (rich liquid) which has absorbed the carbon dioxide from its lower part, and discharges the absorption tower exhaust gas that contains the process exhaust gas from which the carbon dioxide has been removed, from its upper part. The absorption liquid is discharged to the first absorption liquid line 42 from the lower part of the absorption tower 11. The absorption tower exhaust gas is discharged to the absorption tower exhaust gas line 43 from the upper part of the absorption tower 11.

The absorption tower 11 of the present embodiment has a structure in which one or more layers of fillers or trays are arranged, in order to efficiently proceed the gas-liquid contact.

The absorption liquid (rich liquid) which has been discharged to the first absorption liquid line 42 is transferred to the regeneration tower 16 by the rich liquid pump 14 through the regenerative heat exchanger 15. At this time, this absorption liquid is heated by heat exchange in the regenerative heat exchanger 15. After that, this absorption liquid is introduced into the regeneration tower 16 from the upper part of the regeneration tower 16.

The regeneration tower 16 is structured, for example, of a countercurrent type gas-liquid contact apparatus. The regeneration tower 16 heats the absorption liquid with the heat of a gas sent from the reboiler 17, and makes the absorption liquid dissipate the carbon dioxide and the steam. Then, the regeneration tower 16 discharges the absorption liquid (lean liquid) which has dissipated the carbon dioxide, from its lower part, and discharges the regeneration tower exhaust gas that contains the dissipated carbon dioxide and steam, from its upper part. The absorption liquid is discharged to the second absorption liquid line 44 from the lower part of the regeneration tower 16. The regeneration tower exhaust gas is discharged to the regeneration tower exhaust gas line 45 from the upper part of the regeneration tower 16. The second absorption liquid line 44 is branched to the third and fourth absorption liquid lines 46 and 48.

The reboiler 17 is arranged on the third absorption liquid line 46. The reboiler 17 heats the absorption liquid which flows through the third absorption liquid line 46, with the heat of the steam flowing through the steam line 47, and generates carbon dioxide and steam from the absorption liquid. Then, the reboiler 17 returns these gases together with the absorption liquid to the regeneration tower 16.

These gases which have been returned to the regeneration tower 16 come in gas-liquid contact with the absorption liquid (rich liquid) which flows down the regeneration tower 16, while rising in the regeneration tower 16. As a result, the absorption liquid is heated by the heat of these gases, and the carbon dioxide and the steam are dissipated from the absorption liquid. Then, the regeneration tower 16 discharges the absorption liquid (lean liquid) which has dissipated the carbon dioxide, from its lower part, and discharges the regeneration tower exhaust gas that contains the dissipated carbon dioxide and steam, from its upper part, as has been described above.

The regeneration tower 16 of the present embodiment has a structure in which one or more layers of fillers or trays are arranged, in order to efficiently proceed the gas-liquid contact.

The absorption liquid (lean liquid) which has been discharged to the fourth absorption liquid line 48 is transferred to the absorption tower 11 by the lean liquid pump 18 through the regenerative heat exchanger 15 and the cooler 19. At this time, this absorption liquid is cooled by heat exchange in the regenerative heat exchanger 15 and a cooling action in the cooler 19. After that, this absorption liquid is introduced into the absorption tower 11 from the upper part of the absorption tower 11.

As in the above, the absorption liquid of the present embodiment circulates between the absorption tower 11 and the regeneration tower 16 through the first to fourth absorption liquid lines 42, 44, 46 and 48.

A subsequent treatment process of the regeneration tower exhaust gas which has been discharged to the regeneration tower exhaust gas line 45 differs according to the purpose of use, but generally, the moisture content in the exhaust gas is condensed by cooling and is removed. After that, the regeneration tower exhaust gas from which the moisture content has been removed is transferred into a state such as a supercritical state and a liquid state according to the purpose of use, by a compression pump, and is stored or transported by a tank, a lorry, a pipeline and the like.

The carbon dioxide capturing system of FIG. 3 further includes a thermometer 51, a heat quantity controller 52, a steam valve 53, a gravimeter 61, a gas controller 62, a gas supply module 63, a gas line 64, a gas valve 65, a flowmeter 71, a flow rate controller 72, and an absorption liquid valve 73.

(1) Thermometer 51 and Heat Quantity Controller 52

The thermometer 51 monitors the temperature of the absorption liquid accumulated in a still portion of the regeneration tower (bottom part of regeneration tower 16). The thermometer 51 measures the temperature of the absorption liquid in the still portion of the regeneration tower, and outputs the measured value of this temperature to the heat quantity controller 52.

The heat quantity controller 52 controls a heat quantity to be charged into the reboiler 17 per unit time, based on the temperature which has been measured by the thermometer 51. The heat quantity to be charged into the reboiler 17 per unit time is proportional to the flow rate of the steam which flows through the steam line 47. Because of this, the heat quantity controller 52 controls the opening of the steam valve 53 which is provided on the steam line 47, and thereby can control the heat quantity to be charged into the reboiler 17 per unit time. Thereby, the heat quantity controller 52 can control the temperature of the absorption liquid in the still portion of the regeneration tower to an arbitrary preset temperature.

In the present embodiment, the temperature of the absorption liquid in the still portion of the regeneration tower is controlled by automatic control, but may be controlled by manual control due to a worksite operator. Specifically, a man may control the temperature instead of the control by the heat quantity controller 52 of the present embodiment.

On the other hand, when the temperature of the absorption liquid in the still portion of the regeneration tower is controlled by the automatic control, it is desirable to adopt the feedback control such as PID control.

In addition, in the present embodiment, the heat of the steam which flows through the steam line 47 is used as a heat source of the reboiler 17, but another energy source may be used as the heat source of the reboiler 17. For example, an electric power may be converted into heat, and this heat may be used as the heat source of the reboiler 17.

In addition, the thermometer 51 of the present embodiment may measure the temperature of the absorption liquid, in a place except for the still portion of the regeneration tower. For example, the thermometer 51 of the present embodiment may measure the temperature of the absorption liquid, in a place in the regeneration tower 16 except for the still portion. In addition, the thermometer 51 of the present embodiment may also measure the temperature of the absorption liquid, in the reboiler 17, the second absorption liquid line 44 and/or the third absorption liquid line 46. Furthermore, the thermometer 51 of the present embodiment may also measure the temperature of the absorption liquid, in the fourth absorption liquid line 48 in the more upstream side than the regenerative heat exchanger 15.

In addition, the thermometer 51 of the present embodiment may also measure the temperature of a gas which has been generated from the absorption liquid, in place of the temperature of the absorption liquid. An example of such a gas includes a regeneration tower exhaust gas which has been discharged to the regeneration tower exhaust gas line 45.

(2) Gravimeter 61 and Gas Controller 62

The gravimeter 61 monitors the specific gravity of an absorption liquid which flows through the fourth absorption liquid line 48. The gravimeter 61 measures the specific gravity of the absorption liquid which flows through the fourth absorption liquid line 48, and outputs a measured value of this specific gravity to the gas controller 62.

The gas controller 62 controls the amount of a gas which is introduced into the process exhaust gas line 12 together with the process exhaust gas, based on the specific gravity which has been measured by the gravimeter 61. This gas is hereafter referred to as additional gas.

The gas supply module 63 is a unit which can supply one or more types of additional gases. Examples of the additional gas which the gas supply module 63 can supply include the above described absorption tower exhaust gas, the above described regeneration tower exhaust gas, air, an inert gas (for example, nitrogen), a mixed gas obtained by mixing air with an inert gas, and the like.

The gas line 64 connects the gas supply module 63 with the process exhaust gas line 12. The gas valve 65 is arranged on the gas line 64. Therefore, the gas controller 62 can control the amount of the additional gas to be introduced into the process exhaust gas line 12 from the gas supply module 63, by controlling the opening and the opening period of the gas valve 65. The additional gas results in being mixed into the process exhaust gas.

The gas supply module 63 of the present embodiment is provided in order to adjust the carbon dioxide concentration in the process exhaust gas.

When the carbon dioxide concentration in the process exhaust gas needs to be increased, for example, an additional gas having a higher carbon dioxide concentration than the process exhaust gas is introduced into the process exhaust gas line 12. Examples of such an additional gas include the above described regeneration tower exhaust gas, a gas which is supplied from a facility such as a carbon dioxide gas bomb and a carbon dioxide storage tank, and the like.

On the other hand, when the carbon dioxide concentration in the process exhaust gas needs to be decreased, for example, an additional gas having a lower carbon dioxide concentration than the process exhaust gas is introduced into the process exhaust gas line 12. Examples of such an additional gas include the above described absorption tower exhaust gas, air, an inert gas, a mixed gas obtained by mixing air with an inert gas, and the like.

In addition, the gas supply module 63 of the present embodiment can be used also for adjusting the flow rate of the process exhaust gas. In this case, the flow rate of the process exhaust gas is desired to be increased in many cases, without changing the carbon dioxide concentration in the process exhaust gas. In such a case, a first additional gas having a higher carbon dioxide concentration than the process exhaust gas, and a second additional gas having a lower carbon dioxide concentration than the process exhaust gas may be introduced into the process exhaust gas line 12. For example, a gas obtained by mixing the first additional gas supplied from the carbon dioxide gas bomb with the second additional gas supplied from the nitrogen gas bomb may be introduced into the process exhaust gas line 12. In this case, a mixing ratio between the first and second additional gases is desirably set so that the carbon dioxide concentration in the mixture gas coincides with the carbon dioxide concentration in the process exhaust gas.

In the present embodiment, the carbon dioxide concentration and the flow rate of the process exhaust gas may be controlled by the automatic control due to the gas supply module 63, or may also be controlled by the manual control due to the worksite operator. These carbon dioxide concentration and flow rate can be controlled by the adjustment of the opening and the opening period of the gas valve 65. In addition, when it is desired to approach these carbon dioxide concentration and the flow rate to preset values, it is possible to approach the carbon dioxide concentration and the flow rate to the preset values, by adjusting the opening and the opening period of the gas valve 65 based on the specific gravity which has been measured by the gravimeter 61. When the carbon dioxide concentration and the flow rate of the process exhaust gas are controlled by the automatic control, it is desirable to adopt feedback control such as PID control.

In addition, the gravimeter 61 of the present embodiment may measure the specific gravity of the absorption liquid, in a place except for the fourth absorption liquid line 48. For example, the gravimeter 61 of the present embodiment may measure the specific gravity of the absorption liquid, in any one place of the first to third absorption liquid lines 42, 44 and 46.

(3) Flowmeter 71 and Flow Rate Controller 72

The flowmeter 71 monitors the flow rate of an absorption liquid which flows through the first absorption liquid line 42. The flowmeter 71 measures the flow rate of the absorption liquid which flows through the first absorption liquid line 42, and outputs a measured value of this flow rate to the flow rate controller 72.

The flow rate controller 72 controls the flow rate of the absorption liquid which flows through the first absorption liquid line 42, based on the flow rate that has been measured by the flowmeter 71. The flow rate controller 72 of the present embodiment can control the flow rate of the absorption liquid which flows through the first absorption liquid line 42, by controlling the opening of the absorption liquid valve 73 which is provided on the first absorption liquid line 42. Thereby, the flow rate controller 72 of the present embodiment can control the flow rate of the absorption liquid which flows through the first absorption liquid line 42, to an arbitrary preset flow rate.

In the present embodiment, the flow rate of the absorption liquid is controlled by the automatic control, but may be controlled by the manual control due to the worksite operator. Specifically, a man may control the flow rate instead of the control by the flow rate controller 72 of the present embodiment. On the other hand, when the flow rate of the absorption liquid is controlled by the automatic control, it is desirable to adopt the feedback control such as the PID control.

In addition, the flowmeter 71 of the present embodiment may measure the flow rate of the absorption liquid, in a place except for the first absorption liquid line 42. For example, the flowmeter 71 of the present embodiment may measure the flow rate of the absorption liquid, in any one place of the second to fourth absorption liquid lines 44, 46 and 48.

In addition, the absorption liquid valve 73 of the present embodiment may be provided in a place except for the first absorption liquid line 42. For example, the absorption liquid valve 73 of the present embodiment may be provided in any one place of the second to fourth absorption liquid lines 44, 46 and 48.

(4) Method of Operating Carbon Dioxide Capturing System of Third Embodiment

Figure 4:
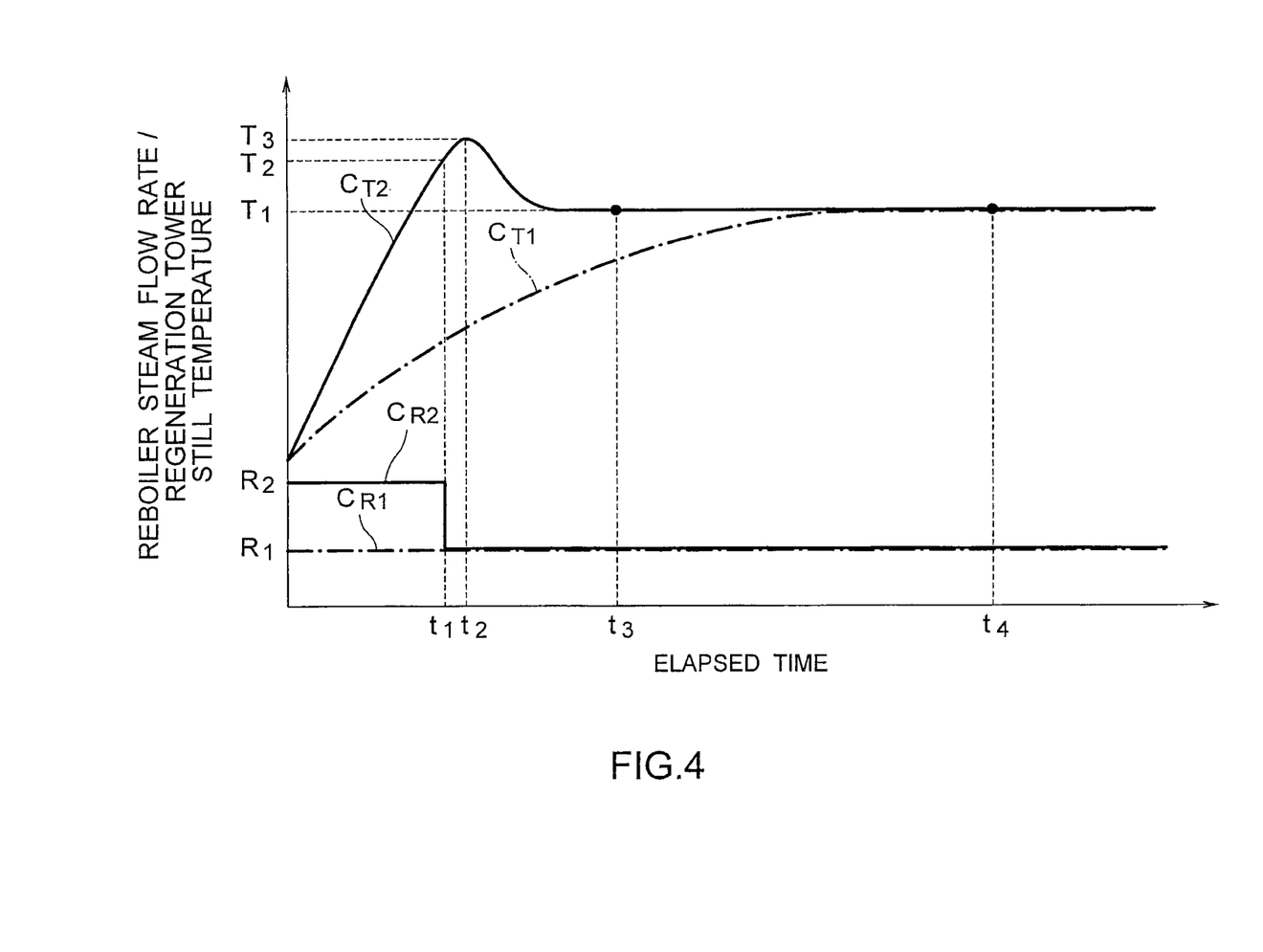
FIG. 4 is a graph for describing a method of operating the carbon dioxide capturing system of the third embodiment.

FIG. 4 is a graph for describing a method of operating the carbon dioxide capturing system of the third embodiment.

Curves $C_{T1}$ and $C_{T2}$ show temperatures of stills of regeneration towers (temperature of absorption liquid accumulated in still portion of regeneration tower 16) in a general carbon dioxide capturing system and in the carbon dioxide capturing system of the third embodiment, respectively. In addition, curves $C_{R1}$ and $C_{R2}$ show flow rates of reboiler steams (flow rate of steam which flows through steam line 47) in the general carbon dioxide capturing system and in the carbon dioxide capturing system of the third embodiment, respectively. A horizontal axis in FIG. 4 indicates an elapsed time. A vertical axis in FIG. 4 indicates the still temperature in the regeneration tower and the flow rate of the reboiler steam.

FIG. 4 illustrates the still temperature in the regeneration tower and the flow rate of the reboiler steam shown when these carbon dioxide capturing systems have been started up. An example of a start-up procedure of promptly starting the carbon dioxide capturing system of the present embodiment up to a rated operation point will be described below with reference to FIG. 4.

In the present embodiment, first, utility systems are started which are necessary for operating a plant, such as electrical systems for cooling water and for equipment. When the start-up of the systems has been completed and the plant is ready for being operated, a circulating system of the absorption liquid is started. The circulating system includes the first to fourth absorption liquid lines 42, 44, 46 and 48, for circulating the absorption liquid between the absorption tower 11 and the regeneration tower 16. Next, steam is introduced into the reboiler 17 from the steam line 47, and also the process exhaust gas is introduced into the absorption tower 11 from the process exhaust gas line 12.

[Procedure of Introducing Steam into Reboiler 17]

A procedure of introducing steam into the reboiler 17 will be described below.

FIG. 4 illustrates a first preset temperature $T_1$, and a second preset temperature $T_2$ which is higher than the first preset temperature $T_1$. FIG. 4 further illustrates a first preset flow rate $R_1$, and a second preset flow rate $R_2$ which is larger than the first preset flow rate $R_1$. The first preset temperature $T_1$ in the present embodiment corresponds to a rated temperature of the still temperature in the regeneration tower. In addition, the first preset flow rate $R_1$ of the present embodiment corresponds to a rated flow rate of a flow rate of the reboiler steam.

When the flow rate of the reboiler steam is set at the first preset flow rate $R_1$, a heat quantity to be charged into the reboiler (heat quantity to be charged into reboiler 17 per unit time) becomes the first preset heat quantity. In addition, when the flow rate of the reboiler steam is set at the second preset flow rate $R_2$, the heat quantity to be charged into the reboiler becomes the second preset heat quantity which is larger than the first preset heat quantity. The first preset heat quantity of the present embodiment corresponds to a rated heat quantity of a heat quantity to be charged into the reboiler.

When the steam is introduced into the reboiler 17 in the start-up of the carbon dioxide capturing system of the present embodiment, first, the flow rate of the reboiler steam is adjusted to the second preset flow rate $R_2$, and thereby the still temperature in the regeneration tower is raised to the second preset temperature $T_2$. FIG. 4 illustrates a state in which the still temperature in the regeneration tower has reached the second preset temperature $T_2$ at the time $t_1$.

When the still temperature in the regeneration tower has reached the second preset temperature $T_2$, the flow rate of the reboiler steam is changed to the first preset flow rate $R_1$ from the second preset flow rate $R_2$, and thereby the still temperature in the regeneration tower is lowered to the first preset temperature $T_1$ from the second preset temperature $T_2$. FIG. 4 illustrates a state in which the still temperature in the regeneration tower has risen to a temperature $T_3$ at the time $t_2$ due to remaining heat, and then the still temperature in the regeneration tower has been lowered to the first preset temperature $T_1$ at the time $t_3$.

After that, the flow rate of the reboiler steam is kept at the first preset flow rate $R_1$, and thereby the still temperature in the regeneration tower is kept at the first preset temperature $T_1$.

As in the above, in the start-up of the system, the flow rate of the reboiler steam of the present embodiment is adjusted to the second preset flow rate $R_2$ which is larger than the first preset flow rate $R_1$ that is necessary in the stable state of the system. The second preset flow rate $R_2$ may be set at a flow rate of a design limit or a flow rate of an upper limit which has been actually confirmed, but is desirably set at a value of approximately 120% of the first preset flow rate $R_1$.

The carbon dioxide capturing system of the present embodiment adjusts the flow rate of the reboiler steam in the start-up of the system to an excessive flow rate, and thereby can promptly start the system and can promptly shift the system to a stable state. FIG. 4 illustrates a state in which a general carbon dioxide capturing system is shifted to a stable state at the time $t_4$, while the carbon dioxide capturing system of the present embodiment is shifted to a stable state at the time $t_3$ that is earlier than the time $t_4$.

The above described control for the flow rate of the reboiler steam and the still temperature in the regeneration tower is conducted by the heat quantity controller 52 based on the temperature which has been measured by the thermometer 51.

[Procedure of Introducing Process Exhaust Gas into Absorption Tower 11]

Subsequently, a procedure of introducing process exhaust gas into the absorption tower 11 will be described below.

In the start-up of the system of the present embodiment, the gravimeter 61 monitors the specific gravity of the absorption liquid which flows through the fourth absorption liquid line 48. The specific gravity of the absorption liquid is proportional to the carbon dioxide concentration in the absorption liquid. Therefore, the gas controller 62 in the present embodiment can control the carbon dioxide concentration in the absorption liquid to a preset concentration, by adjusting the specific gravity of the absorption liquid to a preset specific gravity. The preset specific gravity and the preset concentration in the present embodiment are a rated specific gravity and a rated concentration of the absorption liquid, respectively, which flows through the fourth absorption liquid line 48.

When the specific gravity which has been measured by the gravimeter 61 is lower than the preset specific gravity, for example, the gas controller 62 introduces the additional gas having a higher carbon dioxide concentration than the process exhaust gas, into the process exhaust gas line 12. Thereby, the specific gravity (carbon dioxide concentration) of the absorption liquid which flows through the fourth absorption liquid line 48 can be increased up to the preset specific gravity (preset concentration).

On the other hand, when the specific gravity which has been measured by the gravimeter 61 is higher than the preset specific gravity, the gas controller 62 introduces the additional gas having a lower carbon dioxide concentration than the process exhaust gas, into the process exhaust gas line 12. Thereby, the specific gravity (carbon dioxide concentration) of the absorption liquid which flows through the fourth absorption liquid line 48 can be decreased down to the preset specific gravity (preset concentration).

By such a control, the system of the present embodiment can promptly adjust the specific gravity of the absorption liquid to the preset specific gravity.

[Procedure of Controlling Flow Rate of Absorption Liquid]

Subsequently, a procedure of controlling a flow rate of an absorption liquid will be described below. First and second preset flow rates of the absorption liquid which flows through the first absorption liquid line 42 are hereafter represented by $Q_1$ and $Q_2$, respectively.

In the present embodiment, the carbon dioxide capturing system adjusts the flow rate of the reboiler steam in the start-up of the system, to an excessive flow rate, and thereby promptly starts the system and promptly shifts the system to a stable state. At this time, in order to further quicken the start-up and the stabilization of the system, it is desirable to adjust also the flow rate of the absorption liquid to an excessive flow rate.

Then, when the flow rate of the reboiler steam is adjusted to the second preset flow rate $R_2$, the flow rate controller 72 of the present embodiment adjusts the flow rate of the absorption liquid which flows through the first absorption liquid line 42, to the second preset flow rate $Q_2$ that is larger than the first preset flow rate $Q_1$. The first preset flow rate $Q_1$ of the present embodiment is a rated flow rate of the absorption liquid which flows through the first absorption liquid line 42.

On the other hand, when the flow rate of the reboiler steam has been changed from the second preset flow rate $R_2$ to the first preset flow rate $R_1$, the flow rate controller 72 of the present embodiment changes the flow rate of the absorption liquid which flows through the first absorption liquid line 42, from the second preset flow rate $Q_2$ to the first preset flow rate $Q_1$.

The carbon dioxide capturing system of the present embodiment adjusts the flow rate of the reboiler steam and the flow rate of the absorption liquid in the start-up of the system, to excessive flow rates, and thereby can more promptly start the system and can more promptly shift the system to a stable state.

The above described operating method can be applied not only when the carbon dioxide capturing system is started up, but also when the carbon dioxide capturing system is shifted to a stable state from an unstable state. By such an operating method, the carbon dioxide capturing system of the present embodiment can promptly shift the system to the stable state from the unstable state. The carbon dioxide capturing system of the present embodiment sets amounts which can be easily measured such as the temperature, the specific gravity, the flow rate and the like of the absorption liquid, to items to be monitored, and thereby it becomes possible to simply conduct the prompt start-up and stabilization of the system.

Fourth Embodiment

Figure 5:
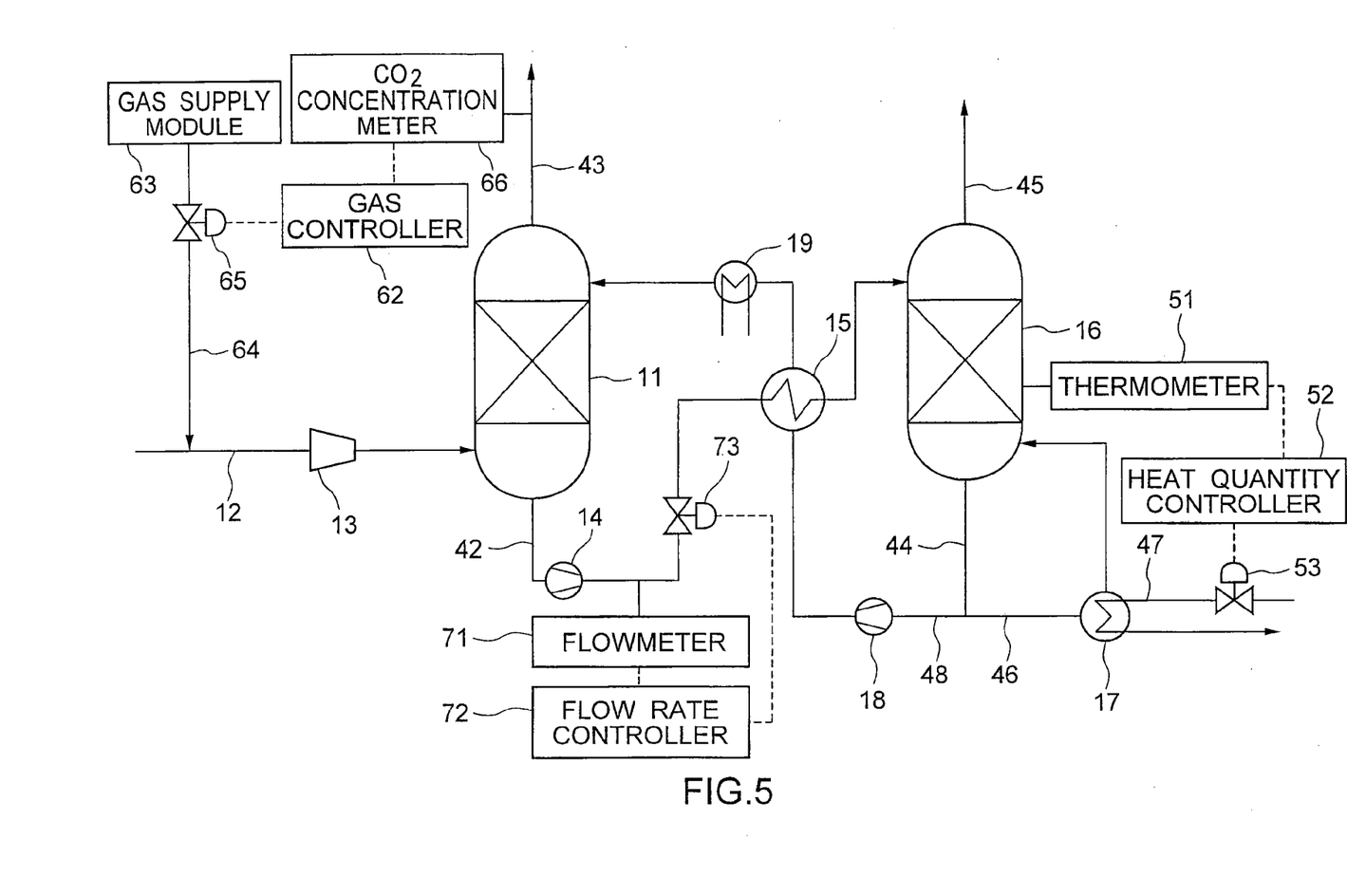
FIG. 5 is a schematic view illustrating a structure of a carbon dioxide capturing system of a fourth embodiment.

FIG. 5 is a schematic view illustrating a structure of a carbon dioxide capturing system of a fourth embodiment.

The carbon dioxide capturing system of FIG. 5 has a $CO_2$ (carbon dioxide) concentration meter 66 in place of the gravimeter 61.

The $CO_2$ concentration meter 66 monitors the carbon dioxide concentration in the absorption tower exhaust gas which has been discharged to the absorption tower exhaust gas line 43. The $CO_2$ concentration meter 66 measures the carbon dioxide concentration in this absorption tower exhaust gas, and outputs a measured value of this carbon dioxide concentration to a gas controller 62. The gas controller 62 controls an amount of an additional gas which is introduced into the process exhaust gas line 12 together with the process exhaust gas, based on the concentration that has been measured by the $CO_2$ concentration meter 66.

In the start-up of the system of the present embodiment, the $CO_2$ concentration meter 66 monitors the carbon dioxide concentration in the absorption tower exhaust gas which has been discharged to the absorption tower exhaust gas line 43. The carbon dioxide concentration in the absorption tower exhaust gas depends on the carbon dioxide concentration in the absorption liquid. Therefore, the gas controller 62 of the present embodiment can control the carbon dioxide concentration in the absorption liquid to a preset concentration, by adjusting the carbon dioxide concentration in the absorption tower exhaust gas to the preset concentration. The preset concentration of the absorption tower exhaust gas in the present embodiment is a rated concentration of the absorption tower exhaust gas which is discharged to the absorption tower exhaust gas line 43.

When the concentration which has been measured by the $CO_2$ concentration meter 66 is lower than the preset concentration, for example, the gas controller 62 introduces an additional gas having a higher carbon dioxide concentration than the process exhaust gas, into the process exhaust gas line 12. Thereby, the carbon dioxide concentration in the absorption tower exhaust gas can be increased up to the preset concentration.

On the other hand, when the concentration which has been measured by the $CO_2$ concentration meter 66 is higher than the preset concentration, the gas controller 62 introduces an additional gas having a lower carbon dioxide concentration than the process exhaust gas, into the process exhaust gas line 12. Thereby, the carbon dioxide concentration in the absorption tower exhaust gas can be decreased down to the preset concentration.

By such a control, the system of the present embodiment can promptly adjust the carbon dioxide concentration in the absorption tower exhaust gas to the preset concentration, and as a result, can promptly adjust the carbon dioxide concentration in the absorption liquid to the preset concentration.

The above described operating method can be applied not only when the carbon dioxide capturing system is started up, but also when the carbon dioxide capturing system is shifted to a stable state from an unstable state. By such an operating method, the carbon dioxide capturing system of the present embodiment can promptly shift the system to the stable state from the unstable state. The carbon dioxide capturing system of the present embodiment sets amounts which can be easily measured such as the temperature of the absorption liquid, the carbon dioxide concentration in the absorption tower exhaust gas, the flow rate of the absorption liquid and the like, to items to be monitored, and thereby it becomes possible to simply conduct prompt start-up and stabilization of the system.

According to at least one of the embodiments which have been described above, it becomes possible to continue the stable operation of the carbon dioxide capturing system even when the carbon dioxide concentration and the gas flow rate of the treatment target gas have rapidly changed, or it becomes possible to enable the carbon dioxide capturing system to be promptly started up or be promptly shifted to the stable state from the unstable state.

While certain embodiments have been described, these embodiments have been presented by way of example only, and are not intended to limit the scope of the inventions. Indeed, the novel systems and methods described herein may be embodied in a variety of other forms; furthermore, various omissions, substitutions and changes in the form of the systems and methods described herein may be made without departing from the spirit of the inventions. The accompanying claims and their equivalents are intended to cover such forms or modifications as would fall within the scope and spirit of the inventions.

The invention claimed is:

1. A carbon dioxide capturing system comprising:
an absorption tower configured to bring a process exhaust gas containing carbon dioxide into contact with an absorption liquid for absorbing the carbon dioxide, and to discharge the absorption liquid having absorbed the carbon dioxide and an absorption tower exhaust gas containing the process exhaust gas from which the carbon dioxide has been removed;
a regeneration tower configured to make the absorption liquid discharged from the absorption tower dissipate the carbon dioxide, and to discharge the absorption liquid having dissipated the carbon dioxide and a regeneration tower exhaust gas containing the carbon dioxide;
a reboiler configured to heat the absorption liquid discharged from the regeneration tower, and to return the heated absorption liquid to the regeneration tower;
a process exhaust gas line configured to introduce the process exhaust gas into the absorption tower;
an absorption liquid line configured to circulate the absorption liquid between the absorption tower and the regeneration tower;

a thermometer configured to measure a temperature of the absorption liquid or a gas generated from the absorption liquid; and a heat quantity controller configured to control a heat quantity to be charged into the reboiler per unit time, based on the temperature measured by the thermometer and a rated temperature of the absorption liquid or the gas generated from the absorption liquid, and configured to control the heat quantity to a value larger than a rated heat quantity of the reboiler in a start-up of the system.

2. The system of claim 1, further comprising:
a gravimeter configured to measure a specific gravity of the absorption liquid; and
a gas controller configured to control an amount of a gas to be introduced into the process exhaust gas line together with the process exhaust gas, based on the specific gravity measured by the gravimeter.

3. The system of claim 2, wherein the gas to be introduced into the process exhaust gas line is the absorption tower exhaust gas, the regeneration tower exhaust gas, air, an inert gas, or a mixed gas obtained by mixing air with the inert gas, and is introduced into the process exhaust gas line at a position located upstream of a blower that is provided on the process exhaust gas line and is configured to pressurize the process exhaust gas to introduce the pressurized process exhaust gas into the absorption tower.

4. The system of claim 1, further comprising:
a concentration meter configured to measure a carbon dioxide concentration in the absorption tower exhaust gas; and
a gas controller configured to control an amount of a gas to be introduced into the process exhaust gas line together with the process exhaust gas, based on the carbon dioxide concentration measured by the concentration meter.

5. The system of claim 4, wherein the gas to be introduced into the process exhaust gas line is the absorption tower exhaust gas, the regeneration tower exhaust gas, air, an inert gas, or a mixed gas obtained by mixing air with the inert gas, and is introduced into the process exhaust gas line at a position located upstream of a blower that is provided on the process exhaust gas line and is configured to pressurize the process exhaust gas to introduce the pressurized process exhaust gas into the absorption tower.

6. The system of claim 1, further comprising:
a flowmeter configured to measure a flow rate of the absorption liquid flowing through the absorption liquid line; and
a flow rate controller configured to control the flow rate of the absorption liquid flowing through the absorption liquid line, based on the flow rate measured by the flowmeter.

7. The system of claim 1, wherein
the heat quantity controller is configured to adjust the heat quantity to be charged into the reboiler per unit time to a second preset heat quantity that is higher than a first preset heat quantity, so as to raise the temperature of the absorption liquid or the gas generated from the absorption liquid to a second preset temperature that is higher than a first preset temperature,
the heat quantity controller is configured to change the heat quantity to be charged into the reboiler per unit time from the second preset heat quantity to the first preset heat quantity, so as to lower the temperature of the absorption liquid or the gas generated from the absorption liquid from the second preset temperature to the first preset temperature, and
the first preset temperature is the rated temperature of the absorption liquid or the gas generated from the absorption liquid.

8. The system of claim 1 further comprising:
a first introduction module configured to introduce a first gas having a higher carbon dioxide concentration than the process exhaust gas into the process exhaust gas line, and including a first valve provided on a flow path of the first gas;
a second introduction module configured to introduce a second gas having a lower carbon dioxide concentration than the process exhaust gas into the process exhaust gas line, and including a second valve provided on a flow path of the second gas;
a valve controller configured to control an amount of the first gas to be introduced into the process exhaust gas line by controlling an opening of the first valve, and configured to control an amount of the second gas to be introduced into the process exhaust gas line by controlling an opening of the second valve.

9. The system of claim 8, wherein the first gas is the regeneration tower exhaust gas.

10. The system of claim 8, wherein the second gas is air, an inert gas, or a mixed gas obtained by mixing air with the inert gas.

11. The system of claim 8, wherein the second gas is the absorption tower exhaust gas.

12. The system of claim 11, further comprising:
a first measuring instrument configured to measure at least one of a carbon dioxide concentration and a gas flow rate of the process exhaust gas; and
a second measuring instrument configured to measure a carbon dioxide concentration of the absorption tower exhaust gas;
wherein the valve controller is configured to control the amount of the first gas to be introduced into the process exhaust gas line, based on a measured value by the first measuring instrument, and to control the amount of the second gas to be introduced into the process exhaust gas line, based on measured values by the first and second measuring instruments.

13. The system of claim 8, further comprising:
a measuring instrument configured to measure at least one of a carbon dioxide concentration and a gas flow rate of the process exhaust gas;
wherein the valve controller is configured to control the amount of the first or second gas to be introduced into the process exhaust gas line, based on a measured value by the measuring instrument.

14. The system of claim 8, further comprising:
a blower provided on the process exhaust gas line and configured to pressurize the process exhaust gas to introduce the pressurized process exhaust gas into the absorption tower;
wherein
the first introduction module is configured to introduce the first gas into the process exhaust gas line at a position located upstream of the blower; and
the second introduction module is configured to introduce the second gas into the process exhaust gas line at a position located upstream of the blower.

* * * * *